United States Patent
Kupinsky et al.

(10) Patent No.: US 9,054,883 B2
(45) Date of Patent: Jun. 9, 2015

(54) METHODS, SYSTEMS, AND COMPUTER READABLE MEDIA FOR USER ACTIVATED POLICY ENHANCEMENT

(75) Inventors: Stuart H. Kupinsky, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 704 days.

(21) Appl. No.: 13/244,245

(22) Filed: Sep. 23, 2011

(65) Prior Publication Data

US 2012/0081557 A1  Apr. 5, 2012

Related U.S. Application Data

(60) Provisional application No. 61/390,160, filed on Oct. 5, 2010.

(51) Int. Cl.
*H04L 12/14* (2006.01)
*H04M 15/00* (2006.01)
*H04W 4/24* (2009.01)

(52) U.S. Cl.
CPC ........... *H04L 12/1407* (2013.01); *H04M 15/00* (2013.01); *H04M 15/66* (2013.01); *H04M 15/745* (2013.01); *H04W 4/24* (2013.01)

(58) Field of Classification Search
CPC . H04L 5/0053; H04L 47/10; H04M 2215/32; H04M 17/00; H04W 4/24; H04W 4/02; H04W 72/04; H04W 28/16
USPC .......... 370/235, 328, 338; 455/405, 406, 450; 709/223, 234, 235, 236
See application file for complete search history.

(56) References Cited

U.S. PATENT DOCUMENTS

| | | | |
|---|---|---|---|
| 6,564,055 B1 | 5/2003 | Hronek | |
| 7,319,857 B2 | 1/2008 | Baldwin et al. | |
| 7,770,786 B1 | 8/2010 | Birch et al. | |
| 7,885,654 B2 | 2/2011 | Fadell | |
| 8,023,942 B2 | 9/2011 | Kumar et al. | |
| 2005/0064901 A1 | 3/2005 | Park et al. | |
| 2007/0232307 A1 | 10/2007 | Ibrahim et al. | |
| 2007/0254646 A1 | 11/2007 | Sokondar | |
| 2008/0227434 A1 | 9/2008 | Nitta et al. | |
| 2010/0075669 A1* | 3/2010 | Sparks et al. | 455/433 |
| 2011/0202647 A1* | 8/2011 | Jin et al. | 709/223 |

(Continued)

FOREIGN PATENT DOCUMENTS

WO  WO 2005/069660 A1  7/2005

OTHER PUBLICATIONS

Email to U.S. Patent and Trademark Office dated Jun. 28, 2013.

(Continued)

*Primary Examiner* — Chi H Pham
*Assistant Examiner* — Weibin Huang
(74) *Attorney, Agent, or Firm* — Jenkins, Wilson, Taylor & Hunt, P.A.

(57) ABSTRACT

According to one aspect, the subject matter described herein includes a method for subscriber activated policy enhancement. The method may include receiving a policy enhancement code from a user device at a policy enhancement server (PES). The method may further include obtaining at least one policy enhancement corresponding to the policy enhancement code in response to receiving the policy enhancement code from the user device. The method may further include enhancing at least one policy aspect of a policy for the user device based on the policy enhancement.

5 Claims, 5 Drawing Sheets

(56) References Cited

U.S. PATENT DOCUMENTS

2011/0286395 A1* 11/2011 Liebsch et al. ............... 370/328
2012/0096139 A1* 4/2012 Cackowski et al. ........... 709/223

OTHER PUBLICATIONS

"3rd Generation Partnership Project; Technical Specification Group Core Network and Terminals; Policy and Charging Control over Gx reference point (Release 9)," 3GPP TS 29.212 V9.2.0 (Mar. 2010).
Amendment under 37 C.F.R. § 1.116 for U.S. Appl. No. 12/542,667 (Jun. 17, 2014).
Final Office Action for U.S. Appl. No. 12/542,667 (Jan. 17, 2014).
Non-Final Office Action for U.S. Appl. No. 12/542,667 (Sep. 19, 2013).
Non-Final Office Action for U.S. Appl. No. 12/542,667 (May 9, 2013).
Final Office Action for U.S. Appl. No. 12/542,667 (May 22, 2012).
Non-Final Office Action for U.S. Appl. No. 12/542,667 (Dec. 1, 2011).
Notice of Allowance and Fee(s) Due for U.S. Appl. No. 12/542,667 (Dec. 19, 2014).
Non-Final Office Action for U.S. Appl. No. 12/542,667 (Jul. 1, 2014).
"Gumption: Awarea: Taking RFID to the Streets," Joe McCarthy, pp. 1-4, gumption.typepad.com/blog/2006/03/awarea_taking_r.html (Mar. 10, 2006).
"Test Set for RFID-Enabled Phones," Jonathan Collins, pp. 1-2, RFID Journal, Inc. (2005).
"Cell Phone Service Providers Start Global NFC Initiative," Claire Swedberg, pp. 1-2, RFID Journal, Inc. (2005).

* cited by examiner

METHODS, SYSTEMS, AND COMPUTER READABLE MEDIA FOR USER ACTIVATED POLICY ENHANCEMENT

PRIORITY CLAIM

This application claims the benefit of U.S. Provisional Patent Application Ser. No. 61/390,160 filed Oct. 5, 2010; the disclosure of which is incorporated herein by reference in its entirety.

TECHNICAL FIELD

The subject matter described herein relates to enhancement of network access and/or network resource allocation policies. More specifically, the subject matter relates to methods, systems, and computer readable media for user activated policy enhancement.

BACKGROUND

A policy entity, such as a policy and charging rules function (PCRF) or policy engine, is a policy decision point that may be centrally located in the network and may communicate with access edge devices (e.g., policy enforcement points), applications, and operational support systems/business support systems (OSS/BSS) platforms to manage subscriber access to network resources. The PCRF may collect subscriber and application data, authorize the allocation of network resources, and instruct the user plane network elements on how to proceed with the underlying data traffic. In one aspect, the PCRF may be connected to at least one application function (AF) which includes a network element residing on the control plane representing applications that require dynamic policy and QoS control over user plane behavior. Dynamic policy and charging control (PCC) rules can be derived within the PCRF using information supplied by the AF. A policy and charging enforcement function (PCEF) may be connected to the PCRF on the control plane and may provision PCC rules from the PCRF for policy enforcement. The PCC rules may be utilized for implementing service data flow (SDF) gating and QoS controls associated with users in the network.

Collectively, the PCRF and PCEF may push or pull PCC rules derived from the AF to access edge devices where charging, SDF gating and QoS can be provided. Triggering events such as roaming, volume, or duration controls may also be pushed back towards the AF for allowing the application to dynamically react to changes at the service level. Conventional systems may utilize predefined or pre-loaded PCC rules or controls which can be activated, enhanced, modified, and/or deactivated at any time by the network operator or service provider. Conventional PCRF architectures are not necessarily optimized to support emerging revenue models that incorporate establishment of marketing campaigns between network operators and business partners. Such campaigns may facilitate methods of user activated policy enhancement via various forms of marketing collateral.

Accordingly, and in light of such difficulties, a need exists for methods, systems, and computer readable media for user activated policy enhancement.

SUMMARY

According to one aspect, the subject matter described herein includes a method for user activated policy enhancement. The method may include receiving a policy enhancement code from a user device at a policy enhancement server (PES). The method may further include obtaining at least one policy enhancement corresponding to the policy enhancement code. The method may further include enhancing at least one policy aspect of a policy for the user device based on the policy enhancement.

A system for user activated policy enhancement is also disclosed. The system may enable a user to activate a temporary change in a network and/or a network resource allocation policy. In one embodiment the system may include a policy enhancement server (PES) and a policy control function. The PES may include a communications interface for receiving a policy enhancement code from a user device. The PES may further include a policy enhancement module for determining, using the policy enhancement code, a policy enhancement for the user. The policy control function may enhance at least one aspect of a policy for the user device based on the policy enhancement.

The subject matter described herein for user activated policy enhancement may be implemented using a non-transitory computer readable medium to having stored thereon executable instructions that when executed by the processor of a computer control the processor to perform steps. Exemplary non-transitory computer readable media suitable for implementing the subject matter described herein may include chip memory devices and/or disk memory devices accessible by a processor, programmable logic devices, and application specific integrated circuits.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
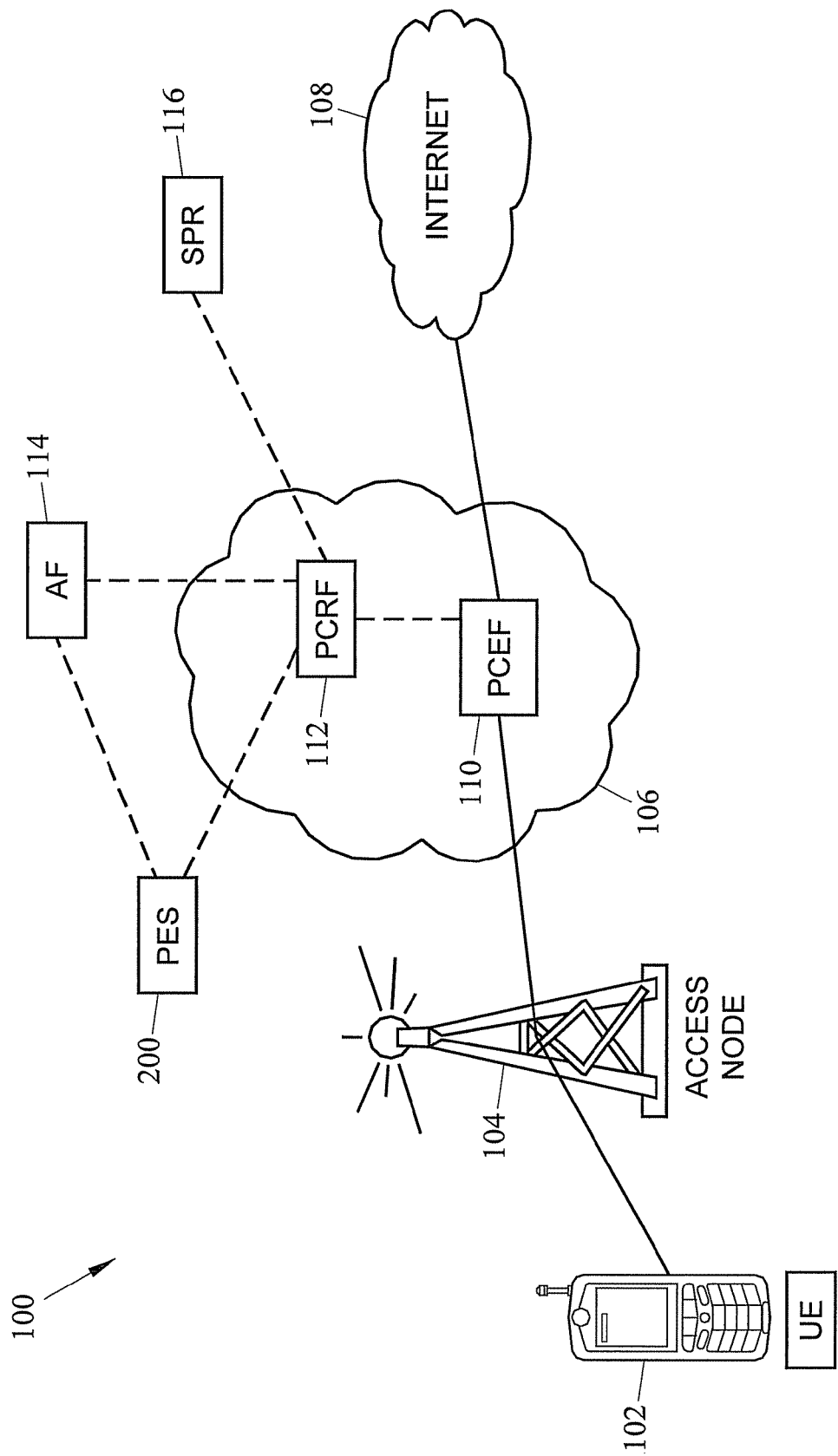
FIG. 1 is a network diagram showing an exemplary network for user activated policy enhancement according to an embodiment of the subject matter described herein.

The subject matter described herein includes methods, systems, and computer readable media for user activated policy enhancement. As mentioned above, a policy entity or policy control function, such as a policy and charging rules function (PCRF) may be connected to at least one application function (AF) via a signaling interface, such as a Diameter-based Rx interface. The AF may include a network element residing on the service plane representing applications that require dynamic policy and quality of service (QoS) control over transport plane behavior. Dynamic policy and charging control (PCC) rules can be derived within the PCRF using information supplied, at least in part, by the AF. Advantageously, the present subject matter described herein provides novel systems and methods for enabling user activated policy enhancement in a communications network, such as a Long Term Evolution (LTE)-based network, Evolved Packet Core (EPS)-based network, or General Packet Radio Service (GPRS)-based network. For example, in one embodiment a user may activate new and/or enhanced policy rules for a predetermined duration (e.g., the new and/or enhanced rules may be activated for 1 hour). A user may activate or trigger new and/or enhanced rules to be derived using a policy enhancement code which can be communicated to a policy enhancement server (PES). In one embodiment the PES includes an AF that communicates session information to PCRF via the Rx interface. The PES can communicate information for generation of new, modified and/or enhanced policy rules or policy elements, for example, PCC rules to be supplied to the user's service at the policy and charging enforcement function (PCEF). In an alternate embodiment, the PES may be a component of and/or be co-located with the PCRF.

By applying the subject matter described herein, network operators and their business partners may enter into marketing campaigns where, for example, "coded" cards (e.g., with a bar code, near field communications (NFC) tag(s), radio frequency (RF) tag(s), Quick Response (QR) codes, etc.) or other marketing collateral may be distributed to subscribers or potential subscribers and may include a "policy enhancement" code. The policy enhancement code may allow a user to temporarily enhance network access and/or network allocation policies in order to experience the enhancements before deciding whether or not to upgrade their service plan and/or purchase the marketed service (e.g., purchasing an upgrade to a new service plan). For example, a subscriber may use a smart phone adapted to capture, detect, scan, read or otherwise acquire the policy enhancement code (e.g., a bar code value, a QR code, NFC/RFID tag code, a bar code image, or an alphabetic or numeric code read by the user and entered into the phone via a keypad) featured on the marketing collateral. The policy enhancement code may be communicated to the PES and associated with new and/or enhanced policy elements or rules to be applied to the subscriber's service at the PCEF. Such enhanced services may include, for example, enhancements to max download bit rate, guaranteed download bit rate, download/upload quotas, allowed service data flow, and/or other network access or network resource allocation policies which can temporarily be made available to the subscriber. In contrast to conventional architectures where policy elements or rules may only be activated or enhanced by network operators and/or service providers, the subject matter described herein can allow the subscriber to quickly and easily enhance their existing network access and/or resource allocation policies via communication of the policy enhancement code from marketing collateral to the PES.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a network diagram showing an exemplary network for user activated policy enhancement according to an embodiment of the subject matter described herein. FIG. 1 illustrates an exemplary communications network 100 according to an embodiment of the subject matter described herein. Referring to FIG. 1, network 100 may include user equipment (UE) 102, an access node (AN) 104 (e.g., a base transceiver station (BTS) or evolved node b), a core network 106, and the Internet 108.

UE 102 represents a device, such as a mobile handset, for communicating with one or more portions of network 100. For example, UE 102 may include a computer, a pager, a smartphone, a phone, a wireless modem, a computing platform, a mobile handset, other subscriber devices and/or combinations thereof. In one embodiment, UE 102 may be adapted to detect, capture, scan, read and/or otherwise acquire an optically scan-able code, such as a quick response (QR) or bar code. The actual bar code value (e.g., '123456') may be obtained via a bar code reader disposed on UE 102 or an image of the bar code may be acquired (e.g., via a camera disposed on UE 102). The policy code may be obtained using bar code image analysis as known in the art. Alternatively, the policy enhancement code may be entered by the user via the keypad of UE 102. UE 102 may also include an NFC enabled device adapted to detect, capture, scan, and/or read NFC tags including, for example, RF identification (RFID) tags using an RFID reader integrated within the smart-phone or device. In further aspects, UE 102 may include a Bluetooth enabled device capable of exchanging information over short distances using, for example, short wavelength radio transmissions in the ISM band from 2400-2480 MHz from fixed and/or mobile devices.

UE 102 may communicate with access node 104. Access node 104 may be located within an access network (not shown). An access network may include nodes, functions, devices, and/or components for providing a UE 102 access to services, functions, or devices in one or more networks (e.g., core network 106). For example, an access network may include a radio access network (RAN) or other access network, such as a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, or an evolved HSPA (eHSPA+) network.

Access node 104 may perform radio access functions for connecting UE 102 with various communications networks and/or nodes. Access node 104 may communicate with core network 106 using gateway functionality. For example, access node 104 or other node (e.g., a gateway) may communicate messages (e.g., authentication or mobility related messages) to one or more nodes within the core network 106.

Core network 106 may include a network for providing services to UE 102. For example, core network 106 may perform network aggregation, charging, and authentication functions for UE 102. One or more PCC rules may be implemented across core network 106 to facilitate network access and/or network resource allocation policies including, for example, enabling the detection of a service data flow (SDF) and providing parameters for policy and/or charging control. In one embodiment, core network 106 may be at least one of a 3G network, a 3G+ network, a GSM network, a 4G network, an LTE network, an evolved packet core (EPC) network, a 3rd Generation Partnership Project (3GPP) network, a GPRS core network, IMS, or other network.

Core network 106 may also include a PCEF 110 and a PCRF 112 which communicate with each other to implement bandwidth, QoS, and charging policies. Where core network 106 includes an IMS network, the policy control function, such as PCRF 112, may include a resource admission control subsystem (RACS). Core network 106 may also include other nodes, such as one or more AFs 114, a subscriber profile repository (SPR) 116, a Diameter relay agent and/or a Diameter signaling router (DRA/DSR), a mobility management entity (MME), a home subscriber server (HSS), an authentication, authorization, and accounting (AAA) server, and a Bearer Binding and Event Reporting Function (BBERF).

In one embodiment, PCEF 110 may include any suitable entity for enforcing policies (e.g., via one or more policy rules or policy elements such as PCC rules). For example, PCEF 110 may include functionality located at a gateway (e.g., a packet data network (PDN) gateway) or other node for communicating between networks, e.g., Internet 108 or private networks (not shown). In one embodiment, PCEF 110 manages and enforces PCC rules provisioned from PCRF 112. For example, PCC rules may be provided to each service data flow (SDF) and/or UE 102 attempting to use or access PCEF 110 and may include information for handling various traffic and situations. Exemplary PCEF nodes may include, but are not limited to, a Gateway GPRS Support Node (GGSN), a PDN gateway, a Deep Packet Inspection (DPI) node, and a Traffic Detection Function (TDF).

Figure 2:
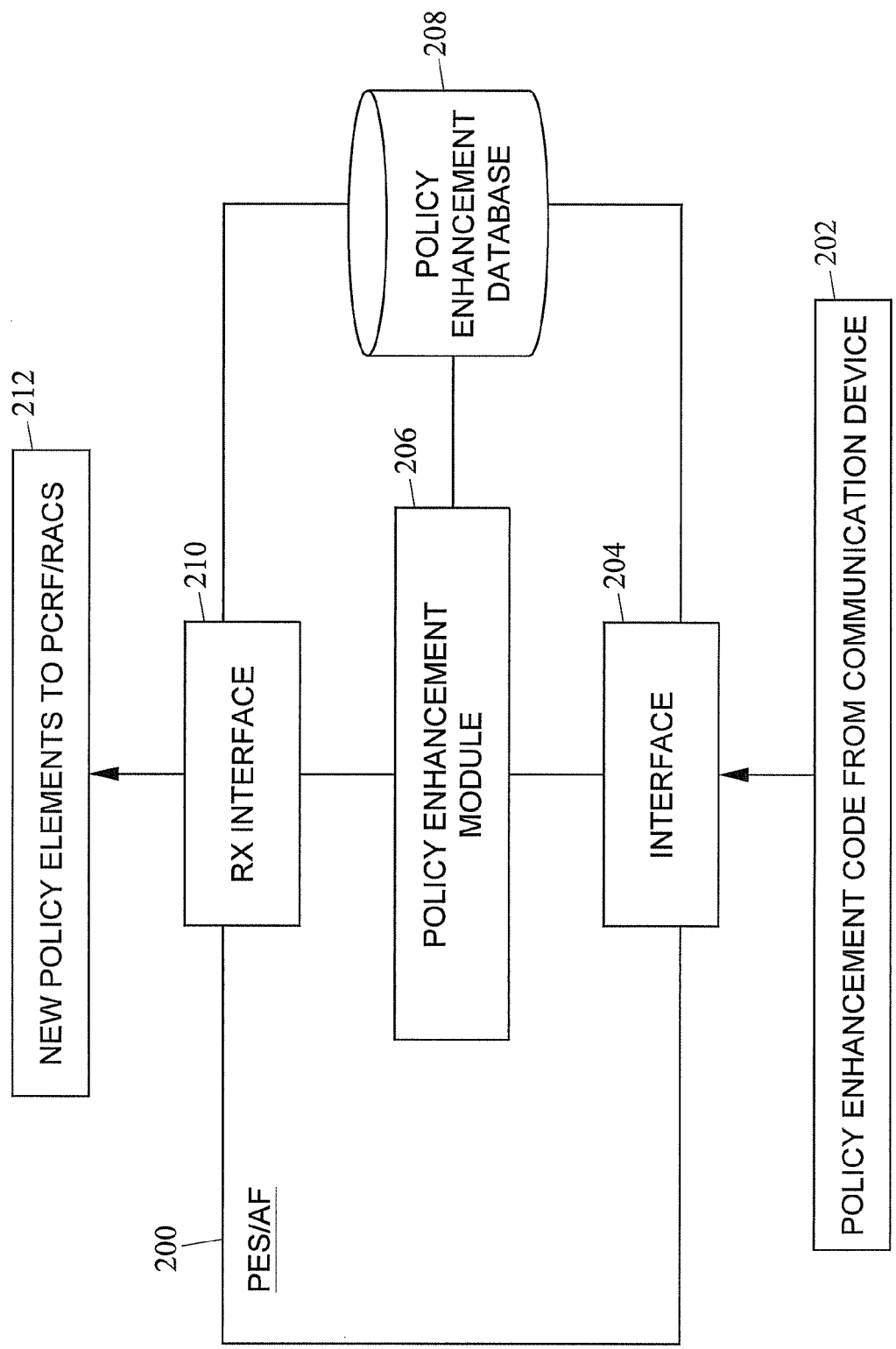
FIG. 2 is a message flow diagram illustrating user activated policy enhancement according to an embodiment of the subject matter described herein.
Figure 4:
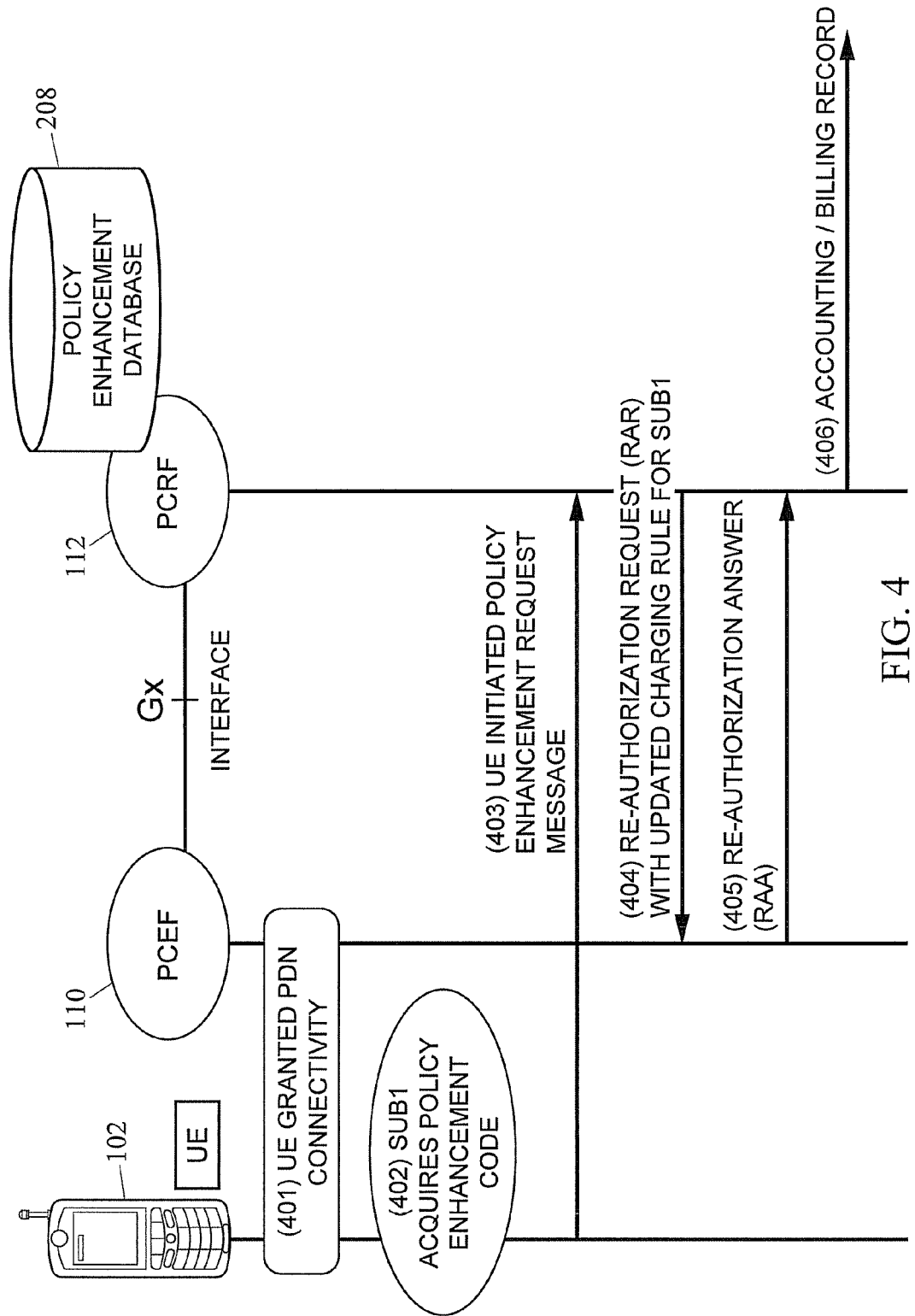
FIG. 4 is a block diagram illustrating an exemplary node for user activated policy enhancement according to an embodiment of the subject matter described herein.

In one embodiment, PCC rules can be based on packet information such that a particular type of service or flow is policed differently from other flows. For example, PCEF 110 may include a deep packet inspection (DPI) function for determining related packets (e.g., SDFs). A SDF may be identified based on one or more common characteristics, including but not limited to a common IP five-tuple. In one instance, PCC rules can include filters used for charging or policing SDFs. That is, PCC rules can include definitions for charging a subscriber based on various characteristics of usage (e.g., data size, data type, or individual media streams within a session). In this example, PCEF 110 may control access to external networks and charge for such access based on rules received from PCRF 112. PCRF 112 may derive policy elements or rules, for example, PCC rules using information provided by the one or more AFs 114 and/or SPRs 116. In one embodiment, an AF 114 can include a node for allowing user activated policy enhancement, such as a policy enhancement server (PES) 200. For example, PES 200 may include an AF or be integrated with and/or co-located with AF 114 (FIG. 2). Alternatively, PES 200 may be a distinct node that is separate from AF 114 such as illustrated in FIG. 1. In further embodiments, PES 200 may be integrated with and/or co-located with PCRF 112 (FIG. 4). Typically, PCRF 112 accesses and implements predefined service policies provided by a network operator, subscriber information, and network-related information in determining policy decisions. Notably, the systems and methods described herein allow individual subscribers or users to activate one or more temporary changes or enhancements to their policies via policy enhancement information communicated to an AF which may include PES 200, to PCRF 112 which may include PES 200 and/or to a separate and distinct PES 200.

PCC rules may be communicated to PCEF 110 in various ways. For example, where PCEF 110 is located in or associated with the packet gateway, PCRF 112 may push rules to PCEF 110 in the packet gateway (P-GW). Alternatively, rules may be pushed from PCRF 112 to PCEF 110 upon request from the PCEF 110. In further embodiments, a Gx interface using Diameter protocol may be used to provision SDF based charging rules from PCRF 112 to PCEF 110. PCEF 110 may then enforce the policy rules received from PCRF 112 (e.g., by setting up and modifying bearers for mapping IP service flows, by providing admission control, and by enforcing QoS limits).

Still referring to FIG. 1, in some embodiments, PCEF 110 may include or be integrated with a gateway GPRS support node (GGSN) for communicating between a GPRS network and external networks, e.g., Internet 108 or private networks (not shown). For example, in an embodiment where core network 106 includes a GPRS core network, PCEF 110 may include a GGSN. PCEF 110 may communicate with serving GPRS support node (SGSN) or other gateway for providing services to UE 102. For example, PCEF 110 may request and receive PCC rules from PCRF 112. Using the PCC rules, PCEF 110 may control access to external networks and charge for such access based on the PCC rules. For example, for an SDF (e.g., one or more related packets) that is under policy control, PCEF 110 may allow packets associated with the SDF to pass through the node if the corresponding gate is open (e.g., as determined by one or more relevant PCC rules). For an SDF that is under charging control, PCEF 110 may allow packets associated with the SDF to pass through the node if there is a corresponding active PCC rule and, for online charging, the online charging service (OCS) has authorized the applicable credit with that charging key. PCEF 110 may let packets associated with an SDF pass through the gateway during the course of the credit re-authorization procedure. If requested by PCRF 112, PCEF 110 may report to PCRF 112 when the status of the related SDF changes, which can be used to monitor an IP-CAN bearer path dedicated for AF signaling traffic.

In one embodiment, PCEF 110 includes a BBERF, or functionality thereof. The BBERF may be any suitable entity for performing bearer binding and/or event reporting. In one embodiment, the BBERF may control user plane traffic. For example, the BBERF may ensure that an SDF is carried over a bearer path with an appropriate QoS and may perform resource reservation. The BBERF may also provide event reporting to one or more nodes in network 100. For example, the BBERF may inform PCRF 112 of various network or bearer-related events, e.g., based upon event triggers installed or requested by PCRF 112. PCRF 112 and BBERF may communicate via a Gxx interface.

PCRF 112 may include any suitable policy entity or policy control function for deriving, generating, obtaining, creating, selecting, or otherwise determining policies (e.g., one or more PCC rules). For example, PCRF 112 may include a stand-alone node, e.g., a policy server or a multimedia policy engine (MPE), or may be co-located or integrated with one or more nodes in network 100, e.g., a DRA/DSR. PCRF 112 may inform PCEF 110, through the use of PCC rules, on the treatment of each SDF that is under PCC control, in accordance with policy decisions. In performing policy decisions, PCRF 112 may communicate with one or more nodes in network 100 for gathering subscription related information. For example, PCRF 112 may communicate with AF 114 and/or PES 200 via an Rx interface to retrieve policy and charging information. Alternatively, PCRF 112 may communicate with SPR 116 via an Sp interface to retrieve policy and charging information. In another example, PCRF 112 may communicate with a network management system (NMS), e.g., via a simple network management protocol (SNMP) interface. In this example, PCRF 112 may poll or otherwise query the NMS or a related database to receive information, e.g., regarding the state of one or more devices in an access network, core network, or other network.

Still referring to FIG. 1, PCC rules or other policy decisions generated at PCRF 112 may be based on one or more of the following: information obtained from one or more AFs 114 and/or PES 200 via an Rx interface (e.g., session, media, and subscriber related information), information obtained from PCEF 110 (e.g., IP-CAN bearer attributes, request type, device information, and subscriber related information), information obtained from SPR 116 (e.g., subscriber and service related data), pre-configured information, and/or combinations thereof. As mentioned above, AF 114 includes a network element offering applications that require dynamic policy and/or charging control over the IP-CAN user plane behavior. In one embodiment AF 114 may include PES 200 and may be configured to implement user activated policy enhancement upon receipt of a policy enhancement code as described further below. In further embodiments, PES 200 may be a distinct node that is separate from AF 114 which can be configured to implement user activated policy enhancement upon receipt of a policy enhancement code as described further below. In one embodiment, AF 114 may include a proxy-call session control function (P-CSCF) of an IMS network.

In one embodiment, an Rx interface is used to exchange dynamic application level session information between AF 114 and PCRF 112 and/or between PES 200 and PCRF 112, as well as IP-CAN specific information and notifications about IP-CAN bearer level events. Session information from AF 114 and/or PES 200 may include part of the input used by PCRF 112 to generate dynamic PCC decisions and derive QoS for the application session. In one embodiment, session information includes information about the AF session (e.g. including but not limited to application identifier, type of media, bandwidth, IP address and port number). To initiate an initial AF or PES session, which may require one or more PCC rules, AF 114 or PES 200 may open an Rx Diameter session with PCRF 112 for the AF or PES session using an Rx specific Auth-Application Request (AAR) command. AF 114 or PES 200 may provide UE identifying information such as, an International Mobile Station Identifier (MI), an IMS public or private identity, a Mobile Subscriber ISDN (MSISDN) identifier, or the IP address of the UE (e.g., UE 102) and corresponding session information using one or more attribute value pairs (AVPs). AF 114 or PES 200 may indicate to PCRF 114 whether the media IP flow(s) should be enabled or disabled using a flow-status AVP. AF 114 or PES 200 may provide session information to PCRF 112 that has been fully negotiated (e.g. based on a session description protocol (SDP) answer to the AAR) or not fully negotiated (e.g., based on an SDP offer to the AAR). In the fully negotiated case, PCRF 112 may authorize the session and provision corresponding PCC and QoS rules to PCEF 110. In the not fully negotiated case and upon receipt of such preliminary session information, PCRF 112 may perform an early authorization check of the session information and may authorize PCC and/or QoS rule requests received from PCEF 110.

AF 114 or PES 200 may modify the session information at any time (e.g. due to an AF session modification or internal AF trigger controls) by sending an AAR command to PCRF 112 containing media-component-description AVP(s) with updated session information. If AF 114 or PES 200 provides service information that has been fully negotiated, PCRF 112 may authorize the session and provision corresponding PCC and/or QoS rules to PCEF 110. In one embodiment, PCRF 112 may process the session information received from AF 114 or PES 200 according to operator policy and may decide whether the request will be accepted or not. If the modified and/or updated session information is not acceptable (e.g. subscribed guaranteed bandwidth for a particular user is exceeded), PCRF 112 may indicate in the AA-Answer the cause for the rejection. The PCRF may additionally provide the acceptable bandwidth within the Acceptable-Service-Info AVP.

Depending on the application, AF 114 or PES 200 may instruct PCRF 112 when the IP flow(s) are to be enabled or disabled to pass through the IP-CAN. AF 114 or PES 200 may do this by sending an AAR message containing the flow status information (i.e., in a Flow-Status AVP) for the flows to be enabled or disabled. In response to this action, PCRF 112 may determine and set an appropriate gate status for the corresponding active PCC rule(s). When an AF or PES 200 session is terminated, if AF 114 or PES 200 had received a successful AA-Answer to the initial AAR, AF 114 or PES 200 may send a Session-Termination-Request command to PCRF 112. Otherwise, AF 114 or PES 200 may wait for the initial AA-Answer to be received prior to sending the Session-Termination-Request command to PCRF 112. During the session, AF 114 or PES 200 may request PCRF 112 to report on the signaling path status for the AF session. The AF shall cancel the request when AF 114 ceases handling UE 102'.

As noted earlier, PES 200 may include an AF 114 and/or be integrated with and/or co-located at AF 114 (e.g., see FIG. 2). In other embodiments, PES 200 may include a node that is separate and distinct from AF 114 and/or PCRF 112 as illustrated in FIG. 1. In further embodiments, PES 200 may be integrated with and/or co-located at PCRF 112 (e.g., see FIG. 4). Referring to FIG. 1, network 100 may include PES 200 for providing user activated policy enhancement. PES 200 may receive a policy enhancement code communicated from a user device, for example, UE 102. The policy enhancement code may be acquired by UE 102 using previously described methods (e.g., optically scanning a bar code, manual entry of a code upon a keypad of UE 102, NEC scan, Bluetooth beacon scan, etc.) and may be communicated to PES 200 using, for example, an SMS message, a MMS message, an IM, an email message, an XML message, a simple object access protocol (SOAP) message, a Diameter protocol message, a SIP message, etc. Upon receipt of the policy enhancement code information, PES 200 may obtain at least one policy enhancement and/or enhanced policy aspect for the user device corresponding to the policy enhancement code. Such policy enhancement and/or enhanced policy aspect may include, without limitation, enhancement to one or more aspects of a user's network services such as maximum guaranteed download bit rate, maximum download bit rate, permitted service flow, permitted QoS class, permitted APN, permitted destination IP address or port, and/or upload/download quota. The policy enhancement may be communicated to PCRF 112 from PES 200 via an Rx interface in a policy enhancement update request and/or notification message. The policy update notification message may include a subscriber ID associated with a user of UE 102 and the specific policy enhancement associated with the policy enhancement code value. Upon receipt of the request or notification message, PCRF 112 may generate at least one new or updated PCC rule associated with the policy enhancement code, and communicate the new or updated PCC rule to PCEF 110.

As described earlier, PCC rules may be based upon and/or include information for managing user plane traffic (e.g., data packets). For example, a PCC rule may include one or more of a (1) rule name, (2) service identifier, (3) SDF filter(s), (4) precedence information, (5) gate status, (6) QoS parameters, (7) charging key (i.e., rating group), (8) other charging parameters, and/or (9) monitoring key. Such information may be enhanced, modified, and/or re-generated upon capture and association of a policy enhancement code to PES 200, for example, by scanning a bar code, reading a NFC or RFID tag, typing a code into a keypad of UE 102 or via Bluetooth signaling.

The rule name or PCC rule identifier may be used to reference a PCC rule in the communication between PCEF 110 and PCRF 112 and may be unique for each PCC rule used during an internet protocol connectivity access network (IP-CAN) session. The service identifier may be used to identify the service or the service component to which the SDF relates. The SDF filter(s) may be used to select the traffic for which the rule applies. For example, an SDF filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). In this example, packets containing information matching the IP five-tuple may be considered part of the SDF for which the corresponding PCC rule is to be applied. In another example, an SDF filter may be based on fewer, different, and/or additional criteria. For example, UE 102 or another node in network 100 may assign an SDF identifier (e.g., a value) to packets in a custom parameter field. In this example, an SDF filter in a PCC rule may use this value for determining traffic to which the PCC rule applies.

Precedence information may define the order in which PCC rules are applied (e.g., at PCEF 110) for a given SDF. For example, where different PCC rules are activated that have overlapping SDF filters, precedence information determines which rules are applicable and/or when the rule is to be applied. In some instances, when a dynamic PCC rule (e.g., based upon information supplied from AF 114 and/or PES 200) and a predefined PCC rule (e.g., based upon information supplied from SPR 116) are activated, precedence information may indicate that the dynamic PCC rule is take precedence, or vice versa. Gate status may indicate whether the SDF, as detected by the SDF filter(s), may pass (i.e., when gate is open) or may be discarded (i.e., when gate is closed) in uplink and/or in downlink direction. QoS information includes the QoS class identifier (e.g., authorized QoS class for the SDF), the Allocation and Retention Priority (ARP), and authorized bit rates for uplink and downlink. Charging parameters may define whether online and offline charging interfaces are used, what is to be metered in offline charging, and on what level PCEF 110 shall report the usage related to the rule. Other charging parameters may include AF record information for enabling charging correlation between the application and bearer layer if AF 114 has provided this information via the Rx interface. The monitoring key for a PCC rule may identify a monitoring control instance that may be used for usage monitoring control of the SDFs controlled by the predefined PCC rule or dynamic PCC rule.

It will be appreciated that FIG. 1 is for illustrative purposes and that various nodes, their locations, and/or their functions may be changed, altered, added, or removed. For example, some nodes and/or functions may be combined into a single entity, e.g., AF 114 and PCRF 112 may be included in an MPE. In a second example, a node and/or function may be located at or implemented by two or more nodes.

FIG. 2 is block diagram illustrating an exemplary node or PES 200 for facilitating user activated policy enhancement according to an embodiment of the subject matter described herein. In one embodiment, PES 200 includes an AF (e.g., previously described AF 114) for dynamic policy enhancement and may include a stand-alone node or may be integrated with additional functionality or another node. For example, PES 200 may be integrated with, include, or be co-located at PCRF 112. In one embodiment, PES 200 provides dynamic information to PCRF 112 via Rx interface for generation of one or more PCC rules. Communication of the information to PCRF 112 can be activated or triggered when a user provides a policy enhancement code to PES 200 via UE 102 (e.g., UE 102 may communicate the code to PES 200 via a short message service (SMS) message, a multimedia message service (MMS) message, an instant message (IM), an email message, an XML message, a simple object access protocol, a Diameter protocol message, a session initiation protocol (SIP) message, or other suitable message protocol/format).

Referring to FIG. 2, PES 200 may receive a policy enhancement code from a communications device (e.g., UE 102) at block 202 via a first communications interface 204 (e.g., via a Gx interface, Gxx interface, Sp interface, an extensible markup language (XML) interface, a session initiation protocol (SIP) interface, a SOAP interface, or a hypertext transfer protocol (HTTP) interface, Diameter, Radius, LDAP or others). The policy enhancement code may be acquired via UE 102, for example, by scanning a bar code to obtain a scanned value, using a camera to capture an image of a bar code, using an NFC/RFID reader to detect an NFC/RFID tag code, or Bluetooth or other radio frequency (RF) or infrared (IR) signaling, or via manual input using the keypad of UE 102.

As noted earlier, the acquired policy enhancement code may be communicated to PES 200 using one of a SMS message, a MMS message, an IM, an email message, an XML message, a simple object access protocol, a Diameter protocol message, and/or a SIP message. In one embodiment, UE 102 includes a Bluetooth, RF, and/or IR receiver to receive or detect an RF/IR beacon signal which provides the policy enhancement code to be used for policy enhancement. Policy enhancement codes may be adapted to trigger a temporary enhancement to and/or change in network access, network resource allocation, and/or usage policies for the subscriber by signaling UE 102. The acquired policy enhancement code may be communicated to PES via first interface 204 and associated with enhanced subscriber policy elements at PES 200. The enhanced policy elements or PCC rules and/or information about useful for PCC rule generation may then be signaled to PCRF 112 and/or RACS (i.e., in an IMS network) for enhancement of a subscriber's service across one or more networks. In one embodiment, the policy enhancement code may enhance and/or change one or more aspects of the subscribers control and charging policy including but not limited to the maximum guaranteed D download bit rate, maximum download bit rate, permitted service flow, permitted QoS class, permitted access point name (APN), permitted destination IP address or port, and/or upload/download quota.

In one embodiment, PES 200 may include a policy enhancement module 206 in communication with a policy enhancement database 208. Upon receiving the policy enhancement code, policy enhancement module 206 may query, using the acquired code, policy enhancement database 208 to determine policy enhancements or enhanced policy aspects provisioned from the code. Policy enhancement database 208 may also log the date and time that the user activated policy enhancement request was received. In one embodiment, the policy enhancement code may include a numeric and/or alphanumeric value (e.g., '123456789') which may be associated with one or more policy enhancements to one or more of a user's policy aspects (e.g., enhanced maximum guaranteed download bit rate, maximum download bit rate, permitted service flow, permitted QoS class, permitted APN, permitted destination IP address/port, download quota) within policy enhancement database 208. In other aspects, policy enhancement code may include an image of a bar code where PES 200 is adapted to process the image so as to determine the associated policy enhancement code value prior to association with policy elements via querying policy enhancement database 208.

Policy enhancement database 208 may be integrated or co-located with PES 200 as illustrated, or it may be located at a node distinct from PES 200. Policy enhancement database 208 may access policy information and store log information based on the date and time of the user request for policy enhancement. Policy dataabase 208 may be pre-configured (e.g., by operator at an initial time) and/or may retrieve or learn associations from another source (e.g., a master policy enhancement database). An example of exemplary policy information that may be stored in policy enhancement database 208 for querying, using a policy enhancement code is shown below in Table 1 below. For example, in Table 1, associations between the policy enhancement code value, subscriber identifiers (ID), and the guaranteed download bit rate aspect of a subscriber's control and charging policy are illustrated. Other associations may be made in the same and/or a different policy enhancement database 208, for example, associations between policy enhancement code value, subscriber ID and one or more of maximum download bit rate, permitted service flow, permitted QoS class, permitted APN, permitted destination address/port, and download quota.

In Table 1, associations between policy enhancement code values (i.e., scan code value), subscriber ID, the enhanced policy value (e.g., guaranteed download bit rate), duration, and enhancement activation are illustrated. Table 1 includes six columns: 'Scan code value', 'Guaranteed Download Bit rate', 'Duration', 'Active', 'Subscriber ID', and 'Use Date/Time'. The first column includes the value of the policy enhancement code acquired using UE 102 and communicated to PES 200. The value may scanned/captured/acquired via UE 102 (e.g., using a bar code reader/scanner, camera, NFC/RFID reader, Bluetooth or RF/IR signaling) and communicated to PES 200 via one of an SMS message, an MMS message, an instant message, an email message, an XML message, a simple object access protocol, a Diameter protocol message, a SIP message, etc. In the alternative, the scan code value may be associated with a bar code image processed at PES 200. PES 200 may associate the policy enhancement or scan code value with one or more specific policy enhancements (e.g., increase in guaranteed download bit rate, maximum download bit rate, download quota etc.) via querying policy enhancement database 208. The second column 'Guaranteed Download Bit rate' includes the specific policy enhancement aspect associated with the code. For example, the value '123456789' is associated with a 25 percent (%) increase in guaranteed download bit rate. The subscriber's service will receive the enhanced download bit rate for one hour as indicated by the 'Duration' column. The 'Active' column indicates whether or not the enhancement is active, that is, whether a user has yet to activate the enhanced policy by acquiring the code. The 'Subscriber ID' column includes various subscriber identifiers for identifying a user associated with the policy information. For example, the scan code value '987654321' has been activated by user 'Sub 1'. The time and date of the user activation may be logged in the 'Use Date/Time' column. For example, user 'Sub 1' activated the policy enhancement on 10/1/2011. A time element may be provided as well.

TABLE 1

Exemplary Policy Information That May Be Stored at or In Policy Enhancement Database

| Scan code value | Guaranteed Download Bit rate | Duration | Active | Subscriber ID | Use Date/Time |
|---|---|---|---|---|---|
| 123456789 | +25% | 1 hour | Yes | — | — |
| 987654321 | +25% | 30 min | No | Sub 1 | Oct. 1, 2011 |

Policy enhancement module 206 may query policy enhancement database 208 to determine one or more specific associated policy enhancements, which may then be communicated via Rx interface 210 to PCRF/RACs as indicated by block 212. For the example above, the 25% increase in guaranteed download bit rate can be communicated to PCRF 112 over Rx interface 210 via policy enhancement module 206. In response to being notified of the requested change and/or enhancement to one or more aspects of the subscriber's control and charging policy (e.g., 25% increase in guaranteed download bit rate), PCRF 112 may generate one or more associated PCC rules and communicate rules to PCEF 110. PCEF will then enforce the new PCC rules and charge accordingly. The enhancement will then be enforced for the associated duration (e.g., 30 min).

Figure 3:
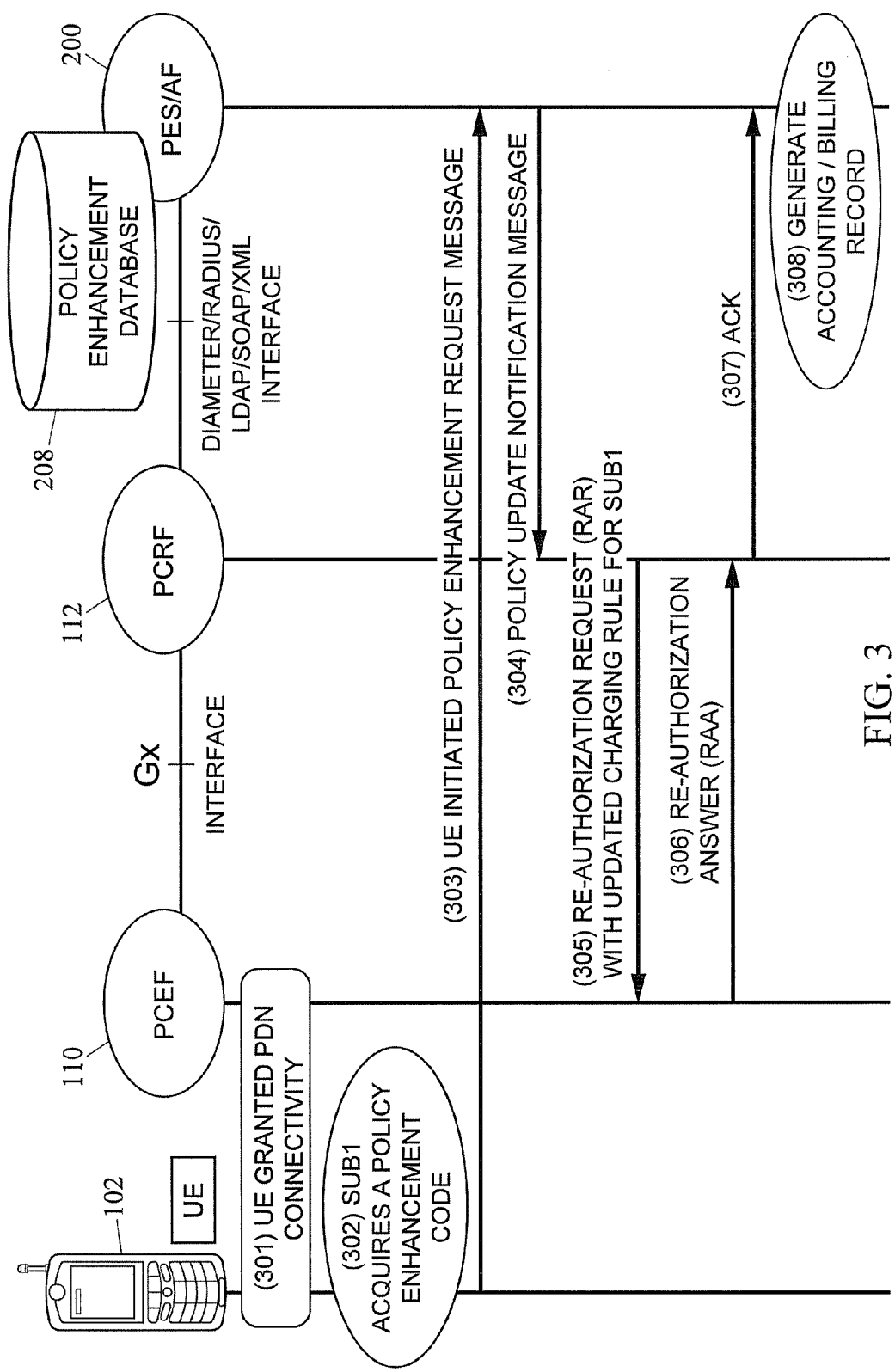
FIG. 3 is a message flow diagram illustrating user activated policy enhancement according to another embodiment of the subject matter described herein.

FIGS. 3 and 4 are message flow diagrams illustrating user activated policy enhancement according to embodiments of the subject matter described herein. In a first embodiment as illustrated by FIG. 3, at step 301 UE 102 requests and is granted connectivity to an IP Packet Data Network (PDN). For example, an Access Point Name (APN) may identify the PDN associated with PES/AF 200 that the user wishes to communicate with. At step 302, a user of UE 102 identified by 'Sub 1' may acquire a policy enhancement code. Again, the policy enhancement code may be available from promotional or marketing collateral and may allow a user to temporarily enhance aspects of their control and charging policy, for example, guaranteed download bit rate, maximum download bit rate, QoS, permitted QoS class, etc. The policy enhancement code may be acquired by using a camera associated with UE 102 to scan or capture a bar code to be used for policy enhancement. UE 102 may also acquire a bar code using an NFC/RFID reader to acquire tag information to be used for policy enhancement or Bluetooth or other RF/IR signaling.

At step 303, UE 102 initiates and communicates a policy enhancement request message to PES/AF 200. The policy enhancement request message may include the policy enhancement code value (e.g., '123456789') and the user subscriber ID (e.g., Sub 1). The policy enhancement code value and user subscriber ID are associated with a new and/or enhanced aspect of the subscriber's control and charging policy (e.g., 25% increase in guaranteed download bit rate). PES/AF 200 initiates and communicates a policy update notification message (e.g., an AAR command containing AVP(s)) to PCRF 112 at step 304. The policy update notification message may include the subscriber ID (e.g., Sub 1) and the specific policy enhancement associated with the policy enhancement code value. At step 305, PCRF 112 may signal a re-Auth Request (RAR) message to PCEF 110 with an updated charging rule for Sub 1. For example, PCRF 112 may generate a new PCC rule based upon information received in the update notification message received from PES/AF 200. At step 306, PCEF 110 sends PCRF 112 a re-Auth Answer (RAA) message indicating receipt of the new and/or updated PCC rule and PCRF 112 indicates or signals an acknowledgment (ACK) to PES/AF 200 at step 307. Accounting and billing records may then be generated according to the new or enhanced PCC rule(s) at step 308. The new or enhanced PCC rule(s) may be in effect for the duration specified by policy enhancement database 208 at PES/AF 200.

FIG. 4 illustrates a message flow diagram for a second embodiment of user activated policy enhancement. In this embodiment, PES 200, including policy enhancement database 208 may be integrated and/or co-located with PCRF 112. At step 401, UE 102 requests and is granted connectivity to an IP PDN for a given APN. At step 402, UE 102 acquires a policy enhancement code as previously described. At step 403, UE 102 initiates and communicates a policy enhancement request message to PCRF 112. The policy enhancement request message may include the subscriber ID (e.g., Sub 1) and the policy enhancement code value (e.g., '12345679' or an optical image to be associated with a value). The value is associated with an updated charging rule for Sub 1 generated at PCRF 112. PCRF 112 may communicate the updated charging rule for Sub 1 to PCEF 110 via an RAR message as indicated at step 404. PCEF 110 may acknowledge the updated charging rule via the RAA message communicated to PCRF 112 at step 405. At step 406, PCRF 112 may communicate accounting and/or billing records per the updated or enhanced charging and control rules.

Figure 5:
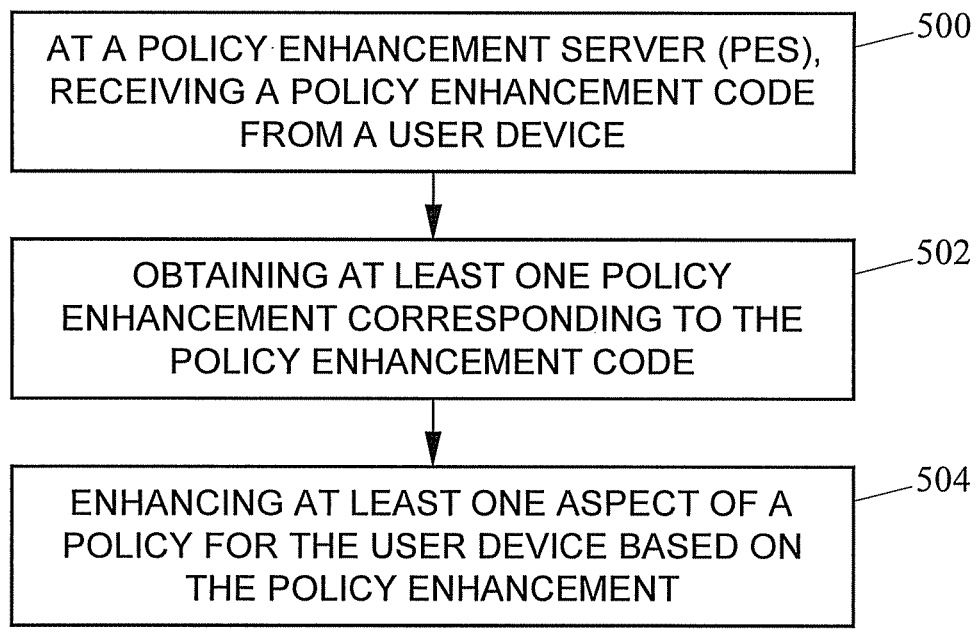
FIG. 5 is flow chart illustrating exemplary steps for user activated policy enhancement according to an embodiment of the subject matter described herein.

FIG. 5 is a flow chart illustrating an exemplary process for user activated policy enhancement according to an embodiment of the subject matter described herein. In some embodiments, the exemplary process described herein, or portions thereof, may be performed by UE 102, PES 200, and/or PCRF 112.

Referring to FIG. 5, in step 500, acquired policy enhancement code may be received at a PES, such as PES 200. As described earlier, PES 200 may include an AF (e.g., AF 114) or be integrated with and/or co-located at AF 114. In other embodiments, PES 200 may be integrated with and/or co-located at PCRF 112. In further embodiments, PES 200 may be a node that is separate and distinct from AF 114 and/or PCRF 112. The policy enhancement code may include a numeric or alphanumeric code value acquired by a user device (e.g., UE 102) for example by scanning a bar code, reading an NFC or RFID tag, manually entering the code into a keypad of UE 102, or acquiring the code via Bluetooth signaling. A bar code image may also be acquired for which PES 200 may be adapted to associate with a value. The policy enhancement code may be associated with one or more policy enhancements or enhanced subscriber policy elements that may be temporarily activated for a given duration. For example, the code may guarantee a max download bit rate for a given duration, such as one hour.

In step 502, at least one policy enhancement (e.g., enhancements to one or more of a maximum guaranteed download bit rate, a maximum download bit rate, a permitted service flow, a permitted QoS class, a permitted access point name (APN), a permitted destination IP address/port, and/or a download quota) may be obtained. The policy enhancement may correspond to the policy enhancement code. At PES 200, the code may be associated with new and/or enhanced policy information to be activated for a specified duration for a specified user. For example, a policy enhancement module 206 within PES 200 may query policy enhancement database 208 using the policy enhancement code to obtain policy enhancement(s) corresponding to the code. PES 200 may log use of the code by the requesting user or subscriber.

In step 504, at least one aspect of a policy for the user device based on the policy enhancement may be enhanced. For example, a PCC rule associated with the policy enhancement code may be generated or modified. In one embodiment, PES 200 may contact PCRF 112 via Rx interface 210 and communicate policy information indicating modified session information and/or new policy rules for the subscriber. PCRF 112 may use the obtained policy information, or a portion thereof, to generate one or more associated PCC rules or policy decisions and communicate the PCC rules to PCEF 110 as indicated at step 506.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing user activated policy enhancement, the method comprising:
   at a policy enhancement server (PES), receiving a policy enhancement code from a user device;
   in response to receiving the policy enhancement code from the user device, obtaining at least one policy enhancement corresponding to the policy enhancement code; and
   enhancing at least one policy aspect of a policy for the user device based on the policy enhancement, further comprising communicating a policy and charging control (PCC) rule including the enhanced policy to a policy and charging enforcement function (PCEF) and comprising enforcing the PCC rule to effect a temporary change in a network and/or a network resource allocation policy.

2. A system for user enhancement of policy control, the system comprising:
   a policy enhancement server (PES) including:
      a communications interface for receiving a policy enhancement code from a user device; and
      a policy enhancement module for determining, using the policy enhancement code, a policy enhancement for the user; and
   a policy control function for enhancing at least one aspect of a policy for the user device based on the policy enhancement wherein the user device is configured to detect, read, and/or acquire the policy enhancement code;
   wherein the policy control function is configured to generate at least one policy and charging control (PCC) rule associated with the policy enhancement code; and
   wherein the PCC rule enhances at least one of a maximum guaranteed download bit rate, a maximum download bit rate, a permitted service flow, a permitted quality of service (QoS) class, a permitted access point name (APN), a permitted destination internet protocol (IP) address or transport layer port, and a download quota.

3. A system for user enhancement of policy control, the system comprising:
   a policy enhancement server (PES) including:
      a communications interface for receiving a policy enhancement code from a user device; and
      a policy enhancement module for determining, using the policy enhancement code, a policy enhancement for the user; and
   a policy control function for enhancing at least one aspect of a policy for the user device based on the policy enhancement wherein the user device is configured to detect, read, and/or acquire the policy enhancement code;

wherein the policy control function is configured to generate at least one policy and charging control (PCC) rule associated with the policy enhancement code; and a policy control and enforcement function (PCEF) for receiving the PCC rule from the policy function.

4. A system for user enhancement of policy control, the system comprising:
   a policy enhancement server (PES) including:
      a communications interface for receiving a policy enhancement code from a user device; and
      a policy enhancement module for determining, using the policy enhancement code, a policy enhancement for the user; and
   a policy control function for enhancing at least one aspect of a policy for the user device based on the policy enhancement, wherein the policy control function is configured to generate at least one policy and charging control (PCC) rule associated with the policy enhancement code, and wherein the PCC rule invokes a temporary change in a network and/or a network resource allocation policy.

5. A system for user enhancement of policy control, the system comprising:
   a policy enhancement server (PES) including:
      a communications interface for receiving a policy enhancement code from a user device; and
      a policy enhancement module for determining, using the policy enhancement code, a policy enhancement for the user; and
   a policy control function for enhancing at least one aspect of a policy for the user device based on the policy enhancement, wherein the PES is configured to receive a policy enhancement code comprising an image of an optical scan code;
wherein the PES is adapted to process the image so as to determine an associated policy enhancement code value.

* * * * *